United States Patent
Matsumoto et al.

(10) Patent No.: US 9,383,573 B2
(45) Date of Patent: Jul. 5, 2016

(54) PHASE MODULATION DEVICE AND LASER MICROSCOPE

(71) Applicants: Kenji Matsumoto, Tokyo (JP); Ayano Tanabe, Tokyo (JP); Masafumi Yokoyama, Tokyo (JP); Nobuyuki Hashimoto, Saitama (JP); Makoto Kurihara, Saitama (JP)

(72) Inventors: Kenji Matsumoto, Tokyo (JP); Ayano Tanabe, Tokyo (JP); Masafumi Yokoyama, Tokyo (JP); Nobuyuki Hashimoto, Saitama (JP); Makoto Kurihara, Saitama (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 10 days.

(21) Appl. No.: 14/376,423

(22) PCT Filed: Feb. 1, 2013

(86) PCT No.: PCT/JP2013/052390
§ 371 (c)(1),
(2) Date: Aug. 2, 2014

(87) PCT Pub. No.: WO2013/115383
PCT Pub. Date: Aug. 8, 2013

(65) Prior Publication Data
US 2015/0338639 A1    Nov. 26, 2015

(30) Foreign Application Priority Data

Feb. 3, 2012   (JP) ................................ 2012-021665
Jul. 4, 2012   (JP) ................................ 2012-150194

(51) Int. Cl.
*G02B 26/06* (2006.01)
*G02B 21/00* (2006.01)
(Continued)

(52) U.S. Cl.
CPC ............ *G02B 26/06* (2013.01); *G02B 21/0032* (2013.01); *G02B 21/0052* (2013.01);
(Continued)

(58) Field of Classification Search
CPC ........................................................ G02B 26/06
USPC ........................... 359/237, 238, 240, 245, 279
See application file for complete search history.

(56) References Cited

U.S. PATENT DOCUMENTS

| 5,530,590 A | 6/1996 | Saito |
| 2004/0184163 A1 | 9/2004 | Nishioka et al. |

(Continued)

FOREIGN PATENT DOCUMENTS

| JP | 3299808 B2 | 7/2002 |
| JP | 2005-224328 A | 8/2005 |

(Continued)

OTHER PUBLICATIONS

David A. Horsley; Hyunkyu Park; Sophie P. Laut and John S. Werner "Characterization for vision science applications of a bimorph deformable mirror using phase-shifting interferometry", Proc. SPIE 5688, Ophthalmic Technologies XV, 133 (May 2, 2005); doi:10.1117/12.591848; http://dx.doi.org/10.1117/12.591848.*

(Continued)

*Primary Examiner* — Bumsuk Won
*Assistant Examiner* — William R Alexander

(57) ABSTRACT

A phase modulation device corrects wave front aberrations generated by an optical system including an objective lens disposed on an optical path of a light flux. The phase modulation device includes a phase modulation element which includes a plurality of electrodes, and modulates the phase of the light flux in accordance with a voltage applied to each electrode, and a control circuit which controls the voltage to be applied to each electrode. The control circuit controls the voltage to be applied to each electrode in such a manner that the light flux is imparted with a phase modulation amount in accordance with a phase modulation profile having a polarity opposite to the polarity of a phase distribution to be determined according to a relational equation representing a relationship between a numerical aperture of the objective lens and a ratio between third-order spherical aberration and fifth-order spherical aberration.

11 Claims, 11 Drawing Sheets

(51) Int. Cl.
*G02B 21/08* (2006.01)
*G02B 27/00* (2006.01)
*G02F 1/1343* (2006.01)

(52) U.S. Cl.
CPC .......... *G02B21/0056* (2013.01); *G02B 21/082* (2013.01); *G02B 27/0068* (2013.01); *G02F 1/134309* (2013.01); *G02F 2203/18* (2013.01); *G02F 2203/50* (2013.01)

(56) References Cited

U.S. PATENT DOCUMENTS

| | | | | |
|---|---|---|---|---|
| 2004/0227101 | A1* | 11/2004 | Iketaki | G02B 26/08 250/458.1 |
| 2005/0083583 | A1* | 4/2005 | Hudyma | G03F 7/70241 359/649 |
| 2006/0262425 | A1* | 11/2006 | Sato | G02F 1/134309 359/738 |
| 2007/0291229 | A1* | 12/2007 | Yamaguchi | A61B 3/14 351/221 |
| 2011/0075928 | A1* | 3/2011 | Jeong | A61B 6/5282 382/181 |
| 2011/0134436 | A1* | 6/2011 | Podoleanu | A61B 3/1015 356/512 |
| 2011/0193269 | A1* | 8/2011 | Ito | B23K 26/032 264/400 |
| 2012/0314147 | A1 | 12/2012 | Sato et al. | |

FOREIGN PATENT DOCUMENTS

| | | |
|---|---|---|
| JP | 2005-267756 A | 9/2005 |
| JP | 2006-330089 A | 12/2006 |
| JP | 2007-134023 A | 5/2007 |
| JP | 4149309 B2 | 9/2008 |
| WO | 2011/105618 A1 | 9/2011 |

OTHER PUBLICATIONS

International Search Report for PCT Application No. PCT/JP2013/052390, Apr. 23, 2013.
International Written Opinion for PCT Application No. PCT/JP2013/052390, Apr. 23, 2013.
European Patent Office, Extended European Search Report for EP Patent Application No. 13743360.3, Aug. 5, 2015.

\* cited by examiner

PHASE MODULATION DEVICE AND LASER MICROSCOPE

TECHNICAL FIELD

The present invention relates to a technology, in an apparatus including an objective lens and using a coherent light source, in which a light flux to be irradiated on a specimen is phase-modulated, and aberrations generated depending on the specimen or various conditions are compensated for acquiring information having enhanced resolution.

BACKGROUND ART

A confocal laser microscope is configured such that laser light is focused on a specimen through an objective lens, a light flux of reflected light, scattered light, or fluorescent light generated on the specimen is transmitted by an optical system, and the light flux transmitted through a pinhole disposed at an optically conjugated position with respect to a light focusing point on the specimen is received on a detector. Disposing the pinhole makes it possible to filter the light generated on the specimen other than the light focusing point. Therefore, the confocal laser microscope is operable to acquire an image with a good S/N ratio.

Further, the confocal laser microscope is configured to acquire a planar image of a specimen by scanning the specimen with laser light along two directions (X-direction and Y-direction) orthogonal to each other, along a plane perpendicular to the optical axis. On the other hand, the confocal laser microscope is configured to acquire a plurality of tomographic images (Z-stack images) in Z-direction by changing the distance in the optical axis direction (Z-direction) between the objective lens and the specimen, whereby a three-dimensional image of the specimen is formed.

In observing a biospecimen, it is often the case that the biospecimen is observed through a cover glass in a state in which the biospecimen is immersed in a broth. Further, generally, the objective lens is designed so that an optimum imaging performance at a position immediately below the cover glass is best. In observing the inside of a biospecimen, it is necessary to acquire an image transmitted through a broth or biological tissues and having a certain depth at an observation position. Aberrations are generated in proportion to the distance from the position immediately below the cover glass to the observation position, and as a result, the resolution may be lowered.

Further, the cover glasses have variations in the thickness thereof within the tolerance range from the design value (e.g. 0.17 mm). Aberrations are generated in proportion to a difference between the actual thickness of the cover glass and the design thickness due to a difference between the refractive index (=1.525) of the cover glass and the refractive index (=1.38 to 1.39) of the biospecimen. Further, when the objective lens is an immersion lens, aberrations are generated in proportion to the depth of a biospecimen with respect to the observation position due to a difference between the refractive index of the biospecimen and the refractive index (=1.333) of water in the same manner as described above. As a result, the resolution to be obtained in observing a deep part of the biospecimen may be lowered.

As one means for solving the above defects, a correction ring has been proposed. The correction ring is a ring-shaped rotating member provided in an objective lens. The distances between lens groups constituting the objective lens is changed by rotating the correction ring. Aberrations due to an error in the thickness of the cover glass or observing a deep part of the biospecimen are cancelled by rotating the correction ring. A scale is marked on the correction ring. For instance, rough numerical values such as 0, 0.17, and 0.23 are indicated concerning the thickness of the cover glass. Adjusting the scale of the correction ring in accordance with the thickness of an actually used cover glass makes it possible to adjust the distances of the lenses in such a manner as to optimize the distances in accordance with the thickness of the cover glass (e.g. see Patent Literature 1).

Further, there is also known a technique of compensating for generated aberrations by a wave front conversion element. This technique is a matrix-drivable shape variable mirror element that is disposed on an optical path of a microscope, a wave front is modulated by the shape variable mirror element based on wave front conversion data measured in advance, and the modulated light wave is allowed to be incident on a specimen, whereby an aberration-corrected image with a high imaging performance is acquired (see e.g. Patent Literature 2).

As the wave front conversion element, a shape variable mirror element configured such that the shape of a reflection surface thereof is electrically controllable is used. When a plane wave is incident on the shape variable mirror element, and if the shape variable mirror element has a concave shape, the incident plane wave is converted into a concave wave front (the amplitude of a concave shape is doubled).

CITATION LIST

Patent Literature

Patent Literature 1: Japanese Patent Publication No. 3,299,808 (see pages 4-6, and FIG. 1)

Patent Literature 2: Japanese Patent Publication No. 4,149,309 (see pages 3-5, and FIG. 1)

SUMMARY OF INVENTION

Technical Problem

However, the operation of the correction ring is performed by manually rotating a ring-shaped adjustment mechanism provided on the objective lens. Therefore, focus deviation or view field deviation resulting from adjusting the adjustment mechanism may occur. Further, it is necessary to repeat adjusting the correction ring and focusing in order to determine the optimum position of the objective lens. This may make the process for optimization cumbersome. Since the process is cumbersome, it takes time to make adjustments in order to obtain an optimum position, and a fluorescent pigment may fade. Fading of a fluorescent pigment may weaken the fluorescent intensity due to continuous emission of excitation light.

Further, adjustment of the correction ring requires fine control. Under the present circumstances, judgment on the adjustment result relies on a person who visually observes an image. It is very difficult to judge whether the objective lens is located at an optimum position. In particular, in photographing images of Z stack, it is necessary to repeat the above operation by the number of times equal to the number of images to be acquired in depth direction, which is very cumbersome. As a result, under the present circumstances, the number of users who sufficiently utilize the correction ring may be small. Further, in some specimens, vibrations resulting from touching the correction ring by hand may affect the observation position. In view of the above, it is desirable to automatically adjust the correction ring without touching the correction ring by hand.

Further, in the technology of compensating for aberrations by a wave front conversion element, the optical system of a microscope may be complicated and the size of the optical system may increase, because the wave front conversion element is of a reflective type. Furthermore, it is necessary to measure the aberrations in advance in order to obtain an optimum compensated wave front. A process of converging the correction amount in order to form an optimum wave front is required. Therefore, this technology is less feasible.

In view of the above, an object of the invention is to solve the above problems and to provide a phase modulation device that corrects for aberrations generated depending on a specimen or an observation condition, without the need of a drastic change in an existing optical system and without the need of touching an objective lens by hand. Another object of the invention is to provide a laser microscope incorporated with the phase modulation device that enables acquiring an image having a high imaging performance.

Solution to Problem

In order to solve the above drawbacks and to accomplish the objects, a phase modulation device for correcting wave front aberrations generated by an optical system including an objective lens disposed on an optical path of a light flux of coherent light to be emitted from a coherent light source has the following configuration.

The phase modulation device includes a phase modulation element which includes a plurality of electrodes, and modulates a phase of the light flux transmitting through the objective lens in accordance with a voltage applied to each of the electrodes; and a control circuit which controls the voltage to be applied to each of the electrodes. The control circuit controls the voltage to be applied to each of the electrodes in such a manner that the light flux is imparted with a phase modulation amount in accordance with a phase modulation profile having a polarity opposite to a polarity of a phase distribution of the wave front aberrations to be determined according to a relational equation representing a relationship between a numerical aperture of the objective lens and a ratio between third-order spherical aberration and fifth-order spherical aberration when the phase distribution of the wave front aberrations generated by the optical system is resolved using Zernike polynomials.

In the phase modulation device, preferably, the relational equation representing the relationship between the numerical aperture of the objective lens and the ratio between third-order spherical aberration and fifth-order spherical aberration may be represented by the following equation:

$$1.91NA - 1.87 - \sqrt{\frac{1.4}{A^2}} \le \frac{B}{A} \le 1.91NA - 1.87 + \sqrt{\frac{1.4}{A^2}}$$

Alternatively, in the phase modulation device, preferably, the relational equation representing the relationship between the numerical aperture of the objective lens and the ratio between third-order spherical aberration and fifth-order spherical aberration may be represented by the following equation:

$$1.37NA - 1.21 - \sqrt{\frac{1.4}{A^2}} \le \frac{B}{A} \le 1.37NA - 1.21 + \sqrt{\frac{1.4}{A^2}}$$

Further alternatively, in the phase modulation device, preferably, the relational equation representing the relationship between the numerical aperture of the objective lens and the ratio between third-order spherical aberration and fifth-order spherical aberration may be represented by the following equation:

$$1.06NA - 0.64 - \sqrt{\frac{1.4}{A^2}} \le \frac{B}{A} \le 1.06NA - 0.64 + \sqrt{\frac{1.4}{A^2}}$$

Note that, in the relational equations described above, A represents a third-order spherical aberration component, B represents a fifth-order spherical aberration component, and NA represents a numerical aperture of the objective lens.

Further, in the phase modulation device, preferably, the phase modulation profile may be determined in such a manner that a phase modulation amount on an optical axis is equal to a phase modulation amount at an end of an active region, the active region being a region capable of phase-modulating a light flux on the phase modulation element.

Alternatively, in the phase modulation device, preferably, the phase modulation profile may be determined in such a manner that a root mean square value of the phase modulation profile is minimized.

Further, in the phase modulation device, preferably, the phase modulation element may be a liquid crystal element.

Further, in the phase modulation device, preferably, the control circuit may adjust the phase modulation profile in accordance with a wavelength of the coherent light.

Further, in the phase modulation device, preferably, the electrodes may include a plurality of annular electrodes in a concentric form, the center of which is an optical axis.

Further, in the phase modulation device, preferably, the annular electrodes may be connected to each other by one or more resistors, and the control circuit may apply a voltage to the annular electrode corresponding to a first position where the phase modulation amount of the phase modulation profile is maximum so that a maximum value of the phase modulation amount is generated on the first position and applies a voltage to the annular electrode corresponding to a second position where the phase modulation amount of the phase modulation profile is minimum in such a manner that a minimum value of the phase modulation amount is generated on the second position. A voltage applied to each of the annular electrodes corresponding to a position other than the first and second positions is determined by dividing a difference between the voltage to be applied to the annular electrode whose phase modulation amount is maximum, and the voltage to be applied to the annular electrode whose phase modulation amount is minimum, by a resistance value of corresponding resistor connected between the annular electrodes.

Further, in the phase modulation device, preferably, the control circuit may apply a voltage to an outermost peripheral annular electrode, as well as to the annular electrodes corresponding to the first position where the phase modulation amount is maximum and corresponding to the second position where the phase modulation amount is minimum.

Further, according to another aspect of the invention, a laser microscope is provided. The laser microscope includes: a coherent light source which irradiates coherent light; a first optical system disposed on an optical path of a light flux of the coherent light, and including an objective lens to focus the light flux on a specimen; a second optical system which transmits a light flux including specimen information derived from the specimen to a detector; and the phase modulation device having one of the above configurations. The phase modulation element of the phase modulation device is disposed between the coherent light source and the objective lens.

Advantageous Effects of Invention

According to the invention, a phase modulation device, and a laser microscope incorporated with the phase modulation device are capable of compensating aberrations generated by deviation of the thickness of a cover glass from the design value, when a deep part of a biospecimen is observed, or when the specimen is observed through the cover glass, and observing the specimen with enhanced resolution. In particular, the phase modulation device is operable to electrically compensate for aberrations without the need of touching a lens by hand. Therefore, it is possible to eliminate the cumbersomeness such as adjusting a correction ring. Thus, the phase modulation device and the laser microscope are advantageous in automatically optimizing the position of the objective lens and in adjusting the position of the objective lens in synchronization with the observation depth in the Z stacking process. Further, the phase modulation device and the laser microscope are capable of minimizing the phase correction amount for adjustment. Furthermore, it is possible to correct aberrations of objective lenses having numerical apertures NAs different from each other by one phase modulation device.

DESCRIPTION OF EMBODIMENTS

Figure 1:
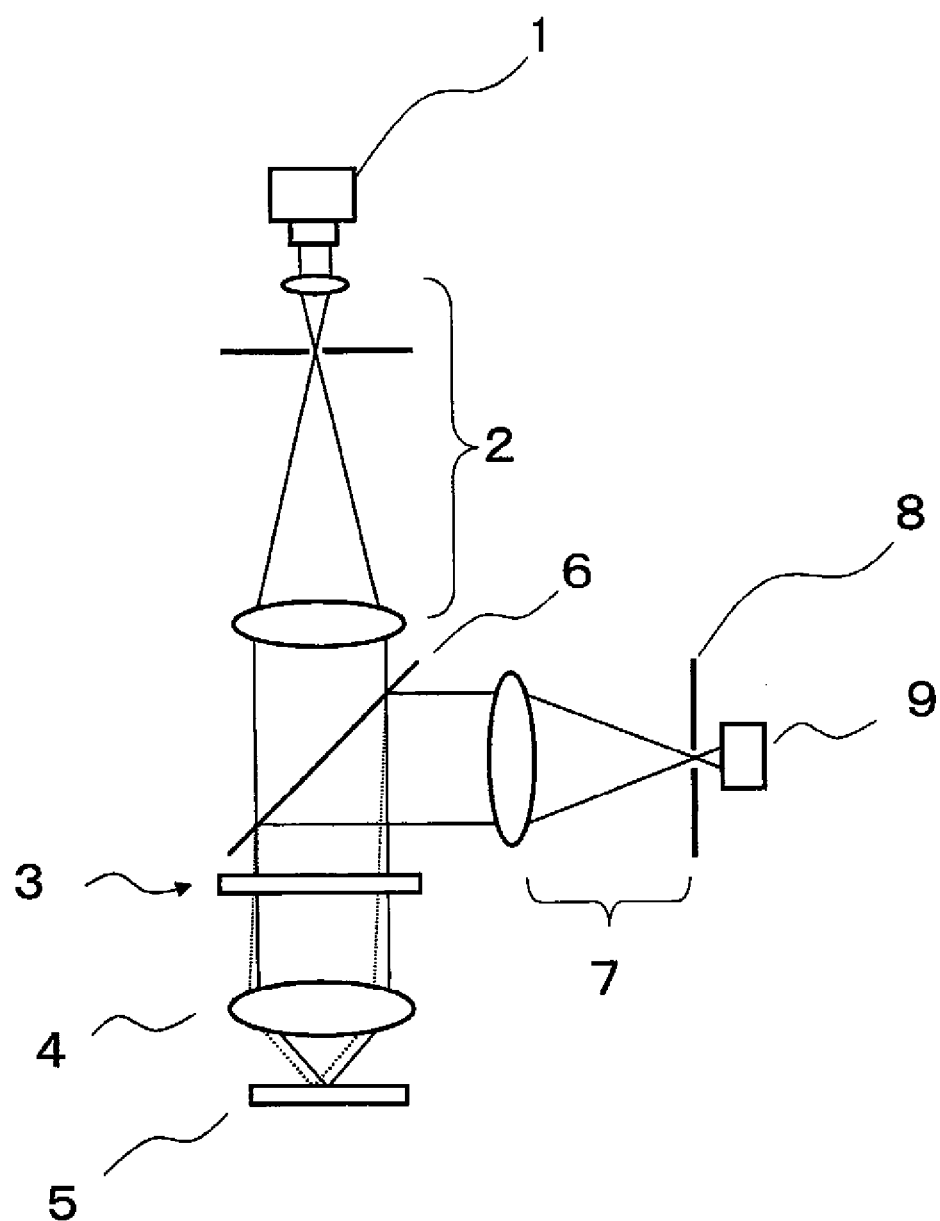
FIG. 1 is a schematic configuration diagram of a laser microscope according to one embodiment of the invention.

In the following, preferred embodiments of a phase modulation device and a laser microscope incorporated with the phase modulation device according to the invention are described in details referring to the drawings.

FIG. 1 is a schematic configuration diagram of a laser microscope according to one embodiment of the invention. A light flux emitted from a laser light source 1 as a coherent light source is adjusted by a collimating optical system 2 into parallel light beam. After the parallel light beam is transmitted through a phase modulation device 3, the modulated light is focused on a specimen 5 through an objective lens 4. A light flux including specimen information such as a light flux reflected or scattered on the specimen 5 or fluorescent light generated on the specimen returns along an optical path, is reflected on a beam splitter 6, and is focused again on a confocal pinhole 8 by a confocal optical system 7 as a second optical system. The confocal pinhole 8 cuts a light flux on the specimen at a position other than the focus position. Therefore, it is possible to obtain a signal having a good S/N ratio by a detector 9.

The objective lens 4 is designed taking into consideration parameters including not only the inside of a lens system, but also the refractive index and the length of the optical path from a lens tip to an observation plane, for instance, the thickness of a cover glass or the presence or absence of a cover glass, and in such a manner that the imaging performance of the objective lens is optimized under the condition with estimated values of these parameters. According to the above configuration, aberrations may be generated due to the depth of a biospecimen as an object to be observed, or a thickness deviation resulting from manufacturing error of a cover glass. The aberrations may lower the imaging performance. In view of the above, the laser microscope is configured to enhance the imaging performance by estimating wave front aberrations generated by an optical system from the laser light source 1 to the light focusing position of a light flux, including the objective lens 4, in accordance with the deviation of the optical path length from the design value; and by displaying, on the phase modulation device 3, a phase distribution that cancels the wave front aberrations as a phase modulation profile.

Generally, it is not possible to dispose a phase modulation device at a pupil position of an objective lens, in view of the space. Therefore, the phase modulation device 3 is disposed at a position conjugate to the pupil, with use of a relay lens. Further, a light flux emitted from the laser light source 1 passes through the phase modulation device 3 twice along an outward path and along a return path. Therefore, the phase modulation device 3 corrects the phase of the light flux along the outward path and along the return path. On the other hand, generally, an objective lens in a microscope is designed to be an infinite system, and a light flux incident on the objective lens is a parallel light beam. In view of the above, it is preferable to dispose the phase modulation device 3 on the light source side of the objective lens 4, specifically, at a position in the vicinity of the objective lens 4. Disposing the phase modulation device 3 as described above is advantageous for the laser microscope to effectively obtain the correction effects.

Figure 2A:
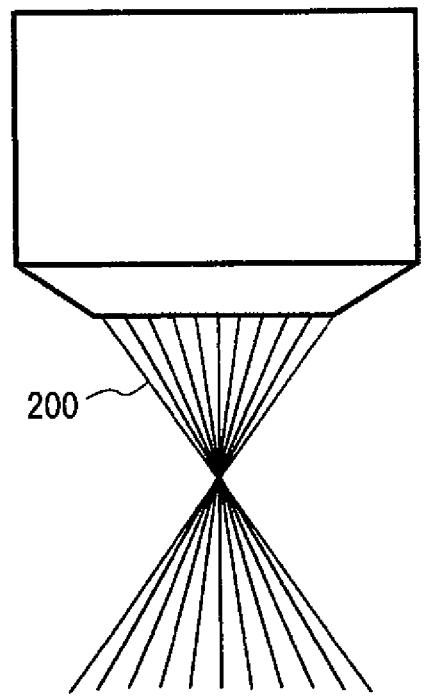
FIG. 2A is a diagram for representing aberrations generated in observing the surface of a specimen and in observing the inside of the specimen at the depth D.
Figure 2B:
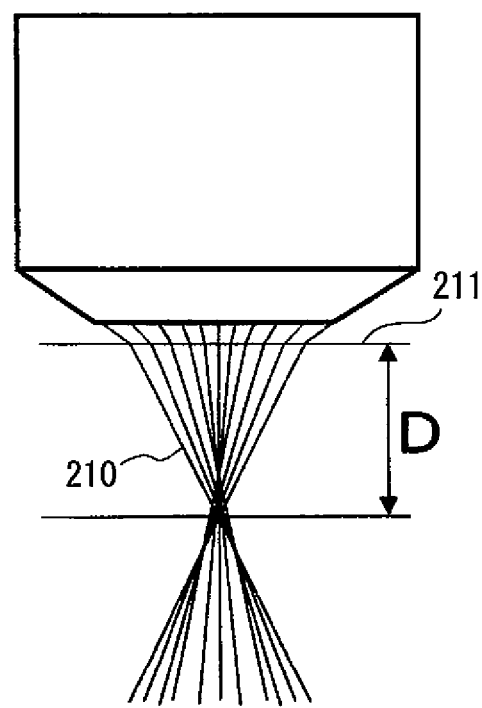
FIG. 2B is a diagram for representing aberrations generated in observing the surface of a specimen and in observing the inside of the specimen at the depth D.

Aberrations which may be generated are described in details. FIG. 2A and FIG. 2B are diagrams schematically illustrating aberrations generated depending on the depth of a specimen to be observed. To simplify the description, the objective lens is designed to be optimized in observing a medium having a uniform refractive index. FIG. 2A illustrates a light flux 200 in observing a medium having a uniform refractive index, as used in the design. FIG. 2A illustrates that the light flux 200 is focused on one point without aberrations. Contrary to the above, FIG. 2B illustrates a light flux 210 in observing the surface of a specimen at the depth D. The light flux 210 is refracted on an interface 211 between the medium in contact with the objective lens and the specimen. The light flux 210 is not focused on one point due to the generated aberrations.

As described above, aberrations are not generated when observing the surface of a specimen, but are generated when observing the inside of the specimen. The laser microscope is generates a phase distribution that cancels wave front aberrations, assuming that the generated aberrations are represented as the wave front aberrations at the pupil position of the objective lens 4, by applying voltages to electrodes of the phase modulation device 3 disposed at the pupil position of the objective lens. According to this configuration, the laser microscope is operable to focus a light flux from the laser light source 1 on one point at an observation position defined on the surface of a specimen or in the inside of the specimen. A light flux generated on a specimen also returns along the optical path in the same manner as described above. Therefore, the laser microscope is operable to convert the light flux into a plane wave.

Wave front aberrations can be represented as a sum of components by resolving the aberrations into the components. It is common to resolve wave front aberrations into orthogonal functions such as Zernike polynomials, and represent the wave front aberrations as a sum of the functions. In view of the above, there is supposed a method for obtaining a correction amount for wave front aberrations by representing the correction amount as a phase distribution of each of the functions of Zernike polynomials, and by changing the relative phase modulation amount of each of the functions. For instance, when aberrations are resolved using the standard Zernike polynomials, the 13-th coefficient ($Z_{13}$) represents third-order spherical aberration, and 25-th coefficient ($Z_{25}$) represents fifth-order spherical aberration. Appropriately adjusting the phase distribution of a correction amount corresponding to each of the coefficients allows for the phase modulation device 3 to correct the third-order spherical aberration and the fifth-order spherical aberration.

Aberrations generated in observing a deep part of a specimen are complex aberrations as combination of defocus or lower-order spherical aberrations and higher-order spherical aberrations. For instance, even if the phase modulation device 3 corrects $Z_{13}$, improvement of the imaging performance is not sufficient. Further, Zernike polynomials are constituted of multitudes of terms. Therefore, it is necessary to create a phase modulation profile corresponding to each term, and to cause the phase modulation device 3 to display the phase modulation profiles in order to perform fine correction. In view of the above, it is preferable to dispose an element obtained by placing a plurality of aberration correction elements one over the other in a light flux, and to use at least one of the aberration correction elements so as to display the plurality of phase modulation profiles.

Actually, however, defocus sensitively changes depending on the depth Z of a specimen. Therefore, defocus is determined by the observation position of the specimen. Further, it is possible to neglect aberrations other than $Z_{13}$ and $Z_{25}$ in Zernike polynomials, because these aberrations are very small. Thus, it is possible to enhance the imaging performance by correcting the term $Z_{13}$ corresponding to third-order spherical aberration and the term $Z_{25}$ corresponding to fifth-order spherical aberration. Further, it is possible to sufficiently and satisfactorily correct aberrations by taking into consideration defocus, third-order spherical aberration, and fifth-order spherical aberration, and even seventh-order spherical aberration in some cases. Thus, taking into consideration disadvantages generated by placing a plurality of aberration correction elements one over the other, for instance, lowering of transmittance resulting from reflection on the interfaces between the aberration correction elements, it is not necessary to correct aberrations by placing a plurality of aberration correction elements one over the other in order to process all of the terms of Zernike polynomials.

Figure 3A:
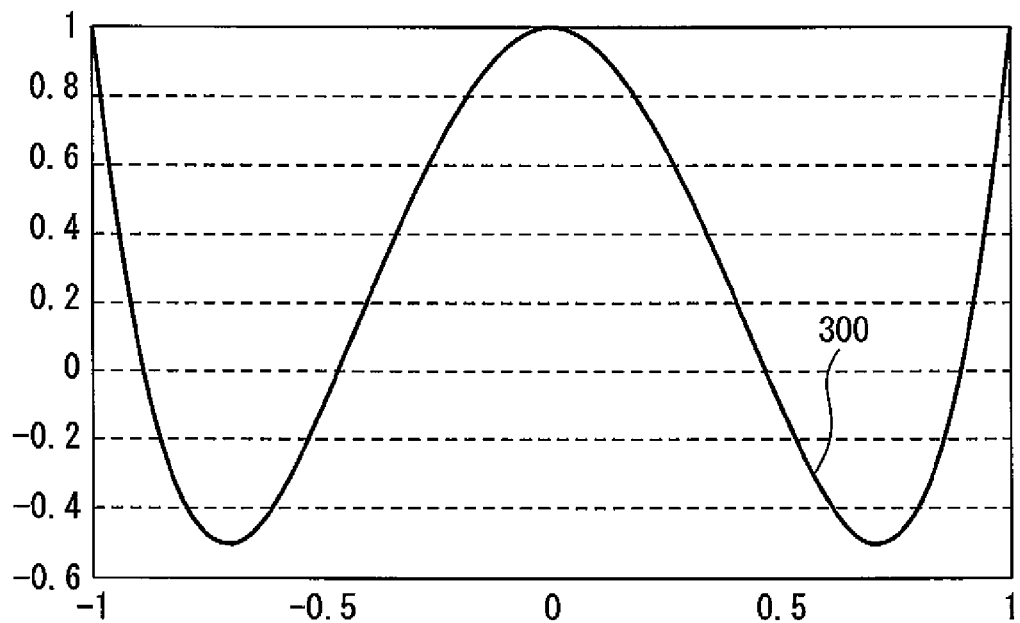
FIG. 3A is a diagram illustrating a phase distribution of third-order spherical aberration.
Figure 3B:
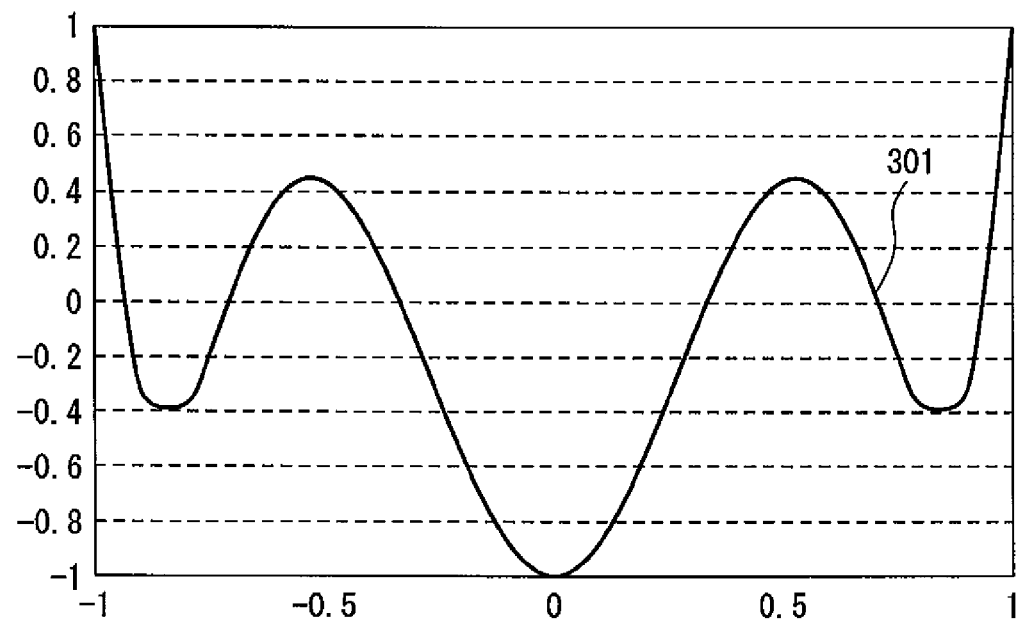
FIG. 3B is a diagram illustrating a phase distribution of fifth-order spherical aberration.

In order to correct the third-order spherical aberration and the fifth-order spherical aberration, it is necessary to create a phase modulation profile from two phase distribution patterns corresponding to respective aberrations. FIG. 3A illustrates a curve 300 representing a phase distribution of third-order spherical aberration, and FIG. 3B illustrates a curve 301 representing a phase distribution of fifth-order spherical aberration. The aberrations in this case have a point-symmetric phase distribution. Each of the curves illustrates a sectional view of the phase distribution. Further, the vertical axis indicates a value obtained by normalizing the phase difference, setting that the positive maximum value of the phase difference is "1", and the horizontal axis indicates a value obtained by normalizing the effective diameter, setting that the maximum value of the effective diameter is "1". In other words, the position "0" on the horizontal axis corresponds to a position on the optical axis.

It is believed that the phase distribution of actually generated aberrations is a linear sum of these aberrations. In view of the above, a phase distribution is obtained by adding an adequate phase distribution component resulting from defocus to the phase distribution of a spherical aberration component which is the sum of a third-order spherical aberration component and a fifth-order spherical aberration component. Then, a profile, whose polarity is opposite to the polarity of the obtained phase distribution and which cancels the phase distribution, is defined as a phase modulation profile. For instance, when an objective lens has a numerical aperture NA of 1.0, the ratio between generated third-order spherical aberration and generated fifth-order spherical aberration is about 4:1, and it is possible to define a profile, whose polarity is opposite to the polarity of a phase distribution obtained by adding a phase component resulting from defocus to the linear sum of these spherical aberrations, as a phase modulation profile.

As described above, in correcting aberrations by a correction ring, it is necessary to repeat adjustment of the correction ring and focusing, which makes the optimization process long and complicated. However, the idea of correcting a phase distribution (a defocus component) that results from focusing as a phase modulation profile by the phase modulation device 3 makes it possible to eliminate the repeating process for optimization, and to efficiently correct aberrations.

Further, the aberration components to be corrected by the phase modulation device 3 are not limited to defocus and spherical aberrations. It is possible to correct various generated aberrations, for instance, still higher-order aberrations, or aberrations that are not spherically symmetrical such as coma aberration. Each of the aberrations has an amount that enables to cancel the aberrations each other. Therefore, the total phase modulation amount in complex aberrations, which is the sum of aberrations of n kinds, is not equal to n-multiple of each of the aberration correction amounts. Thus, using the complex aberrations as aberrations to be corrected is advantageous because it is only necessary for the phase modulation device 3 to impart a light flux with a modulation amount sufficiently smaller than the total phase modulation amount in the complex aberrations.

Next, a phase modulation profile for use in actually correcting aberrations by the phase modulation device 3 is described in details by an example. It is conceived that a phase distribution that remains by focusing matches with a shape such that the root mean square (RMS) value of the wave front having the phase distribution is minimum. Therefore, for instance, there is proposed a method, in which a phase distribution of complex aberrations including a defocus term is obtained in such a manner that the RMS aberration is minimized, and a phase modulation profile is defined from the phase distribution.

Figure 4:
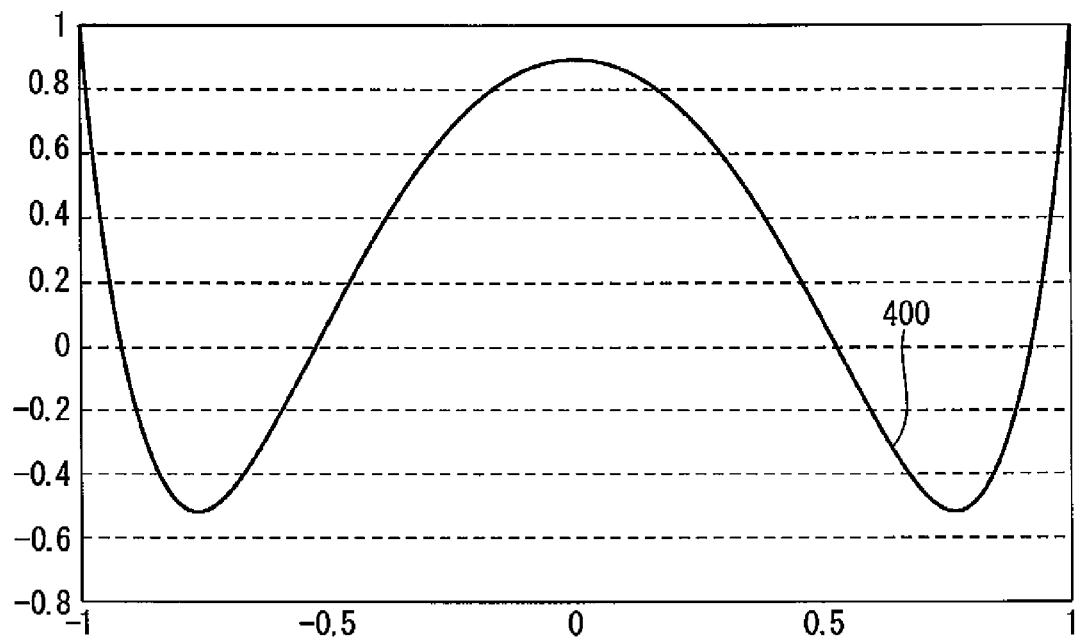
FIG. 4 is a diagram illustrating a sectional profile of a phase distribution of complex aberrations that minimizes the RMS value.

A curve 400 illustrated in FIG. 4 represents a phase distribution of complex aberrations in which a defocus component and a spherical aberration generated on an objective lens whose numerical aperture NA is 1.0 are added in such a manner that the RMS aberration is minimized.

Figure 5:
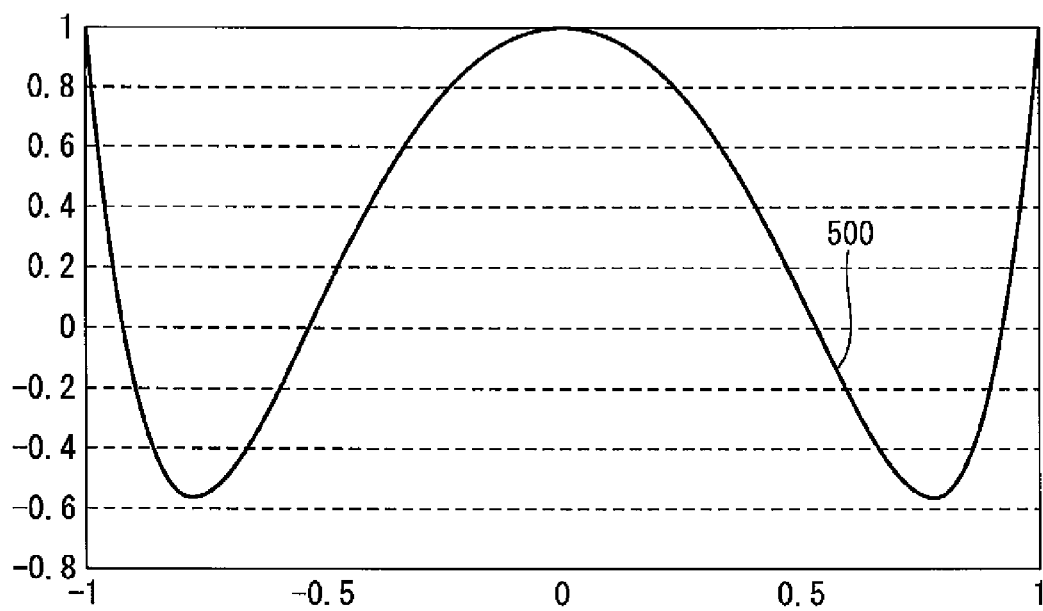
FIG. 5 is a diagram illustrating a sectional profile of a phase distribution of complex aberrations that minimizes the PV value of the phase modulation amount.

Further, there is also proposed an approach, in which a defocus component is added so that the phase modulation amount (hereinafter, called as a PV value) of a phase distribution is minimized, and a phase distribution corresponding to the minimum phase modulation amount is defined as a phase modulation profile. A curve 500 illustrated in FIG. 5 represents a phase distribution of complex aberrations when a defocus component is added in such a manner that the PV value is minimized. When the PV value is minimized, it is possible to set the phase modulation range (i.e. range of the phase modulation amount) to be small. Therefore, when a liquid crystal element is used as a phase modulation element in the phase modulation device, it is possible to make the thickness of the liquid crystal layer of the liquid crystal element to be small. Further, generally, a response time of a liquid crystal element is proportional to a square of the thickness of a liquid crystal layer. Therefore, the smaller the phase modulation range is, the higher the response speed is. Further, the smaller the thickness of the liquid crystal layer is, the more the surface precision is.

Further, it is believed that the phase distribution that remains by focusing differs depending on the specifications of the microscope for use or the image processing software for use. It is possible to optimize the aberration correction by combining a residual aberration pattern specific to each of the microscope and the image processing software with the phase modulation profile of the phase modulation device.

Next, the phase modulation device 3 configured such that a liquid crystal element is used as a phase modulation element, and a voltage is applied to each of electrodes of the liquid crystal element, while using a phase distribution that cancels wave front aberration as a phase modulation profile is described in detail, referring to FIGS. 6 to 9A, and 9B.

Figure 6:
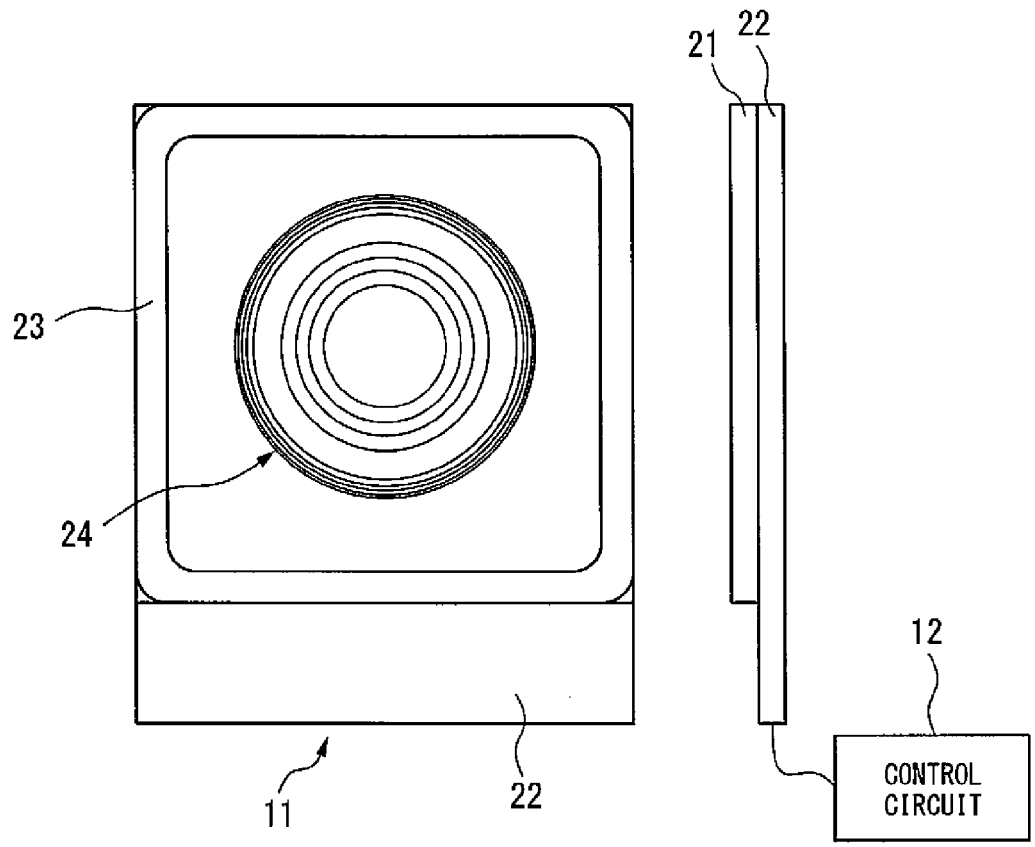
FIG. 6 is a schematic diagram for representing a phase modulation device for use in the laser microscope according to one embodiment of the invention.

FIG. 6 is a plan view of a phase modulation element 11 in the phase modulation device 3. A liquid crystal layer of the phase modulation element 11 is sandwiched between transparent substrates 21 and 22, and the periphery of the liquid crystal layer is sealed by a sealing member 23 so as to prevent leakage of liquid crystal. A plurality of transparent annular electrodes are formed in concentric form, the center of which is the optical axis, in an active region 24 that drives the liquid crystal, in other words, in a region capable of modulating the phase of a transmitting light flux, on surfaces of the transparent substrates 21 and 22 disposed to face each other. A transparent electrode may be formed on one of the transparent substrates 21 and 22 in such a manner as to cover the entirety of the active region 24. The active region 24 has a size determined in accordance with the pupil diameter of the objective lens. Controlling the voltages to be applied to the transparent annular electrodes by a control circuit 12 in the phase modulation device 3 makes it possible to impart a light flux transmitting through the phase modulation element 11 with an intended phase distribution. The control circuit 12 includes, for instance, a processor, and a drive circuit capable of changing the voltages to be output in accordance with a drive signal from the processor.

Figure 7:
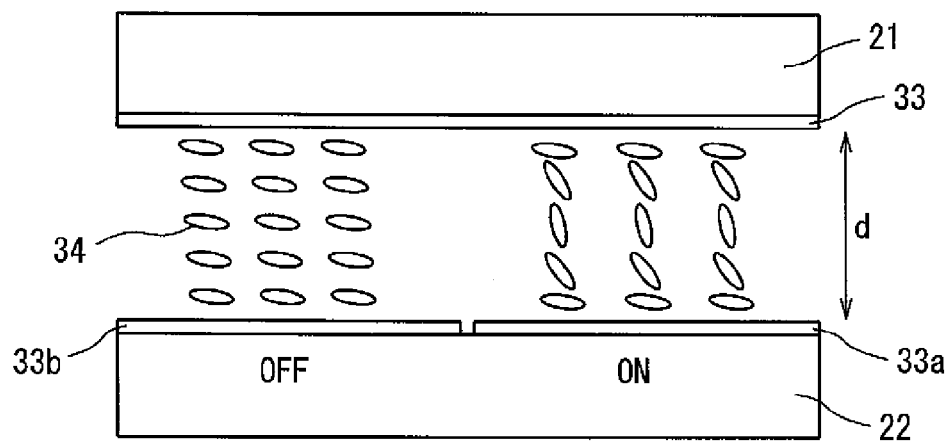
FIG. 7 is a sectional schematic view of a liquid crystal device with homogeneous alignment that serves as a phase modulation device.

FIG. 7 is a sectional schematic view of a part of the active region 24 of the phase modulation element 11 in FIG. 6. The phase modulation element 11 is configured such that liquid crystal molecules 34 are sandwiched between the transparent substrates 21 and 22. Transparent electrodes 33, 33a, and 33b are formed on the surfaces of the transparent substrates 21 and 22 disposed to face each other. FIG. 7 illustrates a state that a voltage is applied between the electrode 33a on the right half side and the electrode 33, and a voltage is not applied between the electrode 33b on the left half side and the electrode 33. The liquid crystal molecules 34 have an elongated molecular structure, and are homogeneously aligned. Specifically, the liquid crystal molecules 34 sandwiched between the two substrates 21 and 22 are aligned to be parallel to each other in the major axis direction thereof, and are aligned in parallel to each interface between each of the substrates 21 and 22 and the liquid crystal layer. In the liquid crystal molecules 34, the refractive index thereof in the major axis direction and the refractive index thereof in a direction orthogonal to the major axis direction differ from each other. Generally, the refractive index $n_e$ with respect to a polarized component (extraordinary ray) in parallel to the major axis direction of the liquid crystal molecules 34 is higher than the refractive index $n_o$ with respect to a polarized component (ordinary ray) in parallel to the minor axis direction of the liquid crystal molecules. Therefore, the phase modulation element 11 configured such that the liquid crystal molecules 34 are homogeneously aligned acts as a uni-axial birefringent element.

Liquid crystal molecules have a dielectric anisotropy, and generally, a force is exerted on the liquid crystal molecules such that the major axis of the liquid crystal molecules is aligned with the electric field direction. In other words, as illustrated in FIG. 7, when a voltage is applied between the electrodes provided in the two substrates for sandwiching the liquid crystal molecules therebetween, the major axis direction of the liquid crystal molecules is inclined from a state in parallel to the substrates toward a direction orthogonal to the surfaces of the substrates in accordance with the voltage. The refractive index $n_\phi$ of the liquid crystal molecules with respect to a light flux of a polarized component in parallel to the major axis of the liquid crystal molecules is represented by: $n_o \leq n_\phi \leq n_e$ (where $n_o$ is the refractive index of ordinary light, and $n_e$ is the refractive index of extraordinary light). Therefore, assuming that the thickness of the liquid crystal layer is d, an optical path length difference $\Delta nd(=n_\phi d - n_o d)$ is generated between the light flux passing through a region where a voltage is applied, and the light flux passing through a region where a voltage is not applied in the liquid crystal layer. The phase difference is $2\pi\Delta nd/\lambda$, where $\lambda$ is the wavelength of a light flux incident on the liquid crystal layer.

Next, a method for imparting a light flux transmitting through the phase modulation element 11 as a liquid crystal element with an intended phase distribution is described in detail. First of all, a phase modulation profile to be displayed is determined, and a voltage to be applied to each of the annular electrodes is determined by dividing the phase modulation profile at a fixed phase interval.

Figure 8:
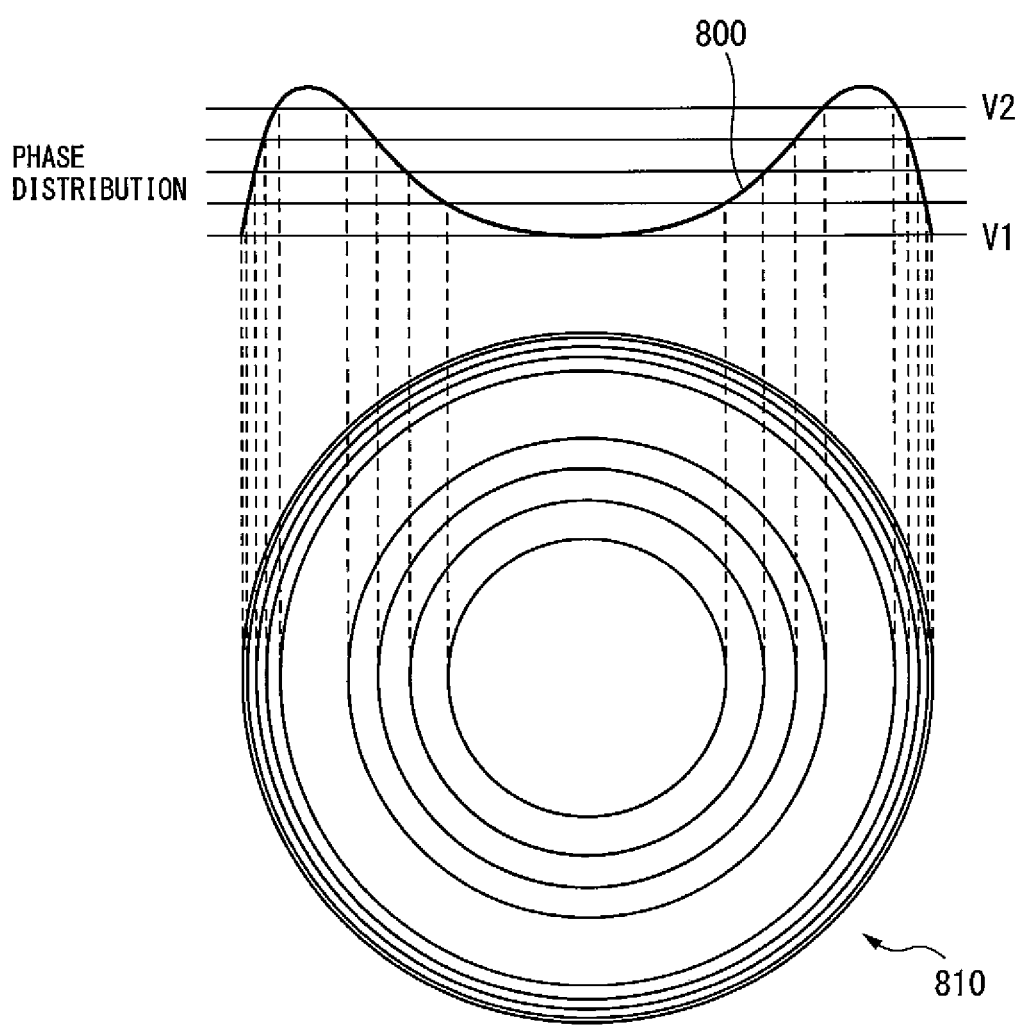
FIG. 8 is a diagram for representing a method for determining an annular electrode structure of a phase modulation device according to one embodiment of the invention.

FIG. 8 is a diagram illustrating a manner as to how a voltage application state is determined in accordance with a phase modulation profile. A curve 800 on the upper side in FIG. 8 represents a sectional view of a phase modulation profile corresponding to a plane passing the optical axis. On the lower side of FIG. 8, there are illustrated annular electrodes 810, for each of which an applied voltage value is determined in accordance with the phase modulation profile. The bold lines in FIG. 8 illustrate spaces between the annular electrodes. Lead-out electrodes and other elements are not illustrated to simplify the illustration. Applying a voltage to each of the annular electrodes by the control circuit 12 in such a manner that a voltage difference between the adjacent annular electrodes corresponds to a fixed step in a voltage range, in which characteristics of the phase modulation amount to be imparted to a light flux transmitting through the phase modulation element 11 with respect to the applied voltage is substantially linear, allows for the phase modulation device 3 to display a profile, in which an intended phase distribution is quantized.

In order to apply a voltage to each of the annular electrodes in such a manner that the voltage difference between the adjacent annular electrodes corresponds to a fixed step, the annular electrodes corresponding to the position where the phase modulation amount is maximum and corresponding to the position where the phase modulation amount is minimum are determined from the phase modulation profile. The control circuit 12 applies an applied voltage serving as the maximum phase modulation amount, and an applied voltage serving as the minimum phase modulation amount to the corresponding annular electrodes, respectively. Further, the annular electrodes adjacent to each other are connected by an electrode (a resistor) having a fixed electrical resistance. Therefore, the voltage difference between the annular electrodes adjacent to each other corresponds to a fixed step by resistance division. Further, controlling the applied voltages as described above is advantageous in simplifying the configuration of the control circuit 12, as compared with a circuit configured to control voltages to be applied to the annular electrodes independently of each other.

Figure 9A:
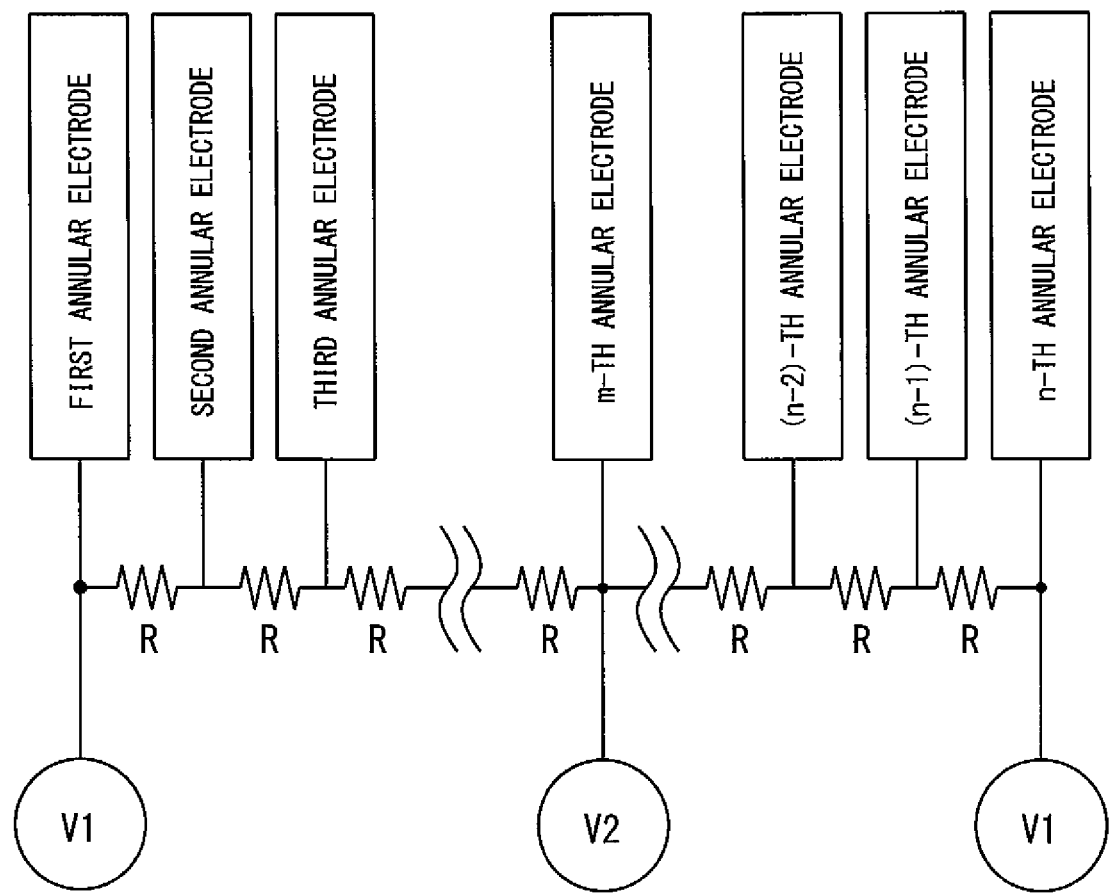
FIG. 9A is a schematic diagram representing a method for connecting between annular electrodes and a method for applying voltages to annular electrodes in the phase modulation device according to one embodiment of the invention.
Figure 9B:
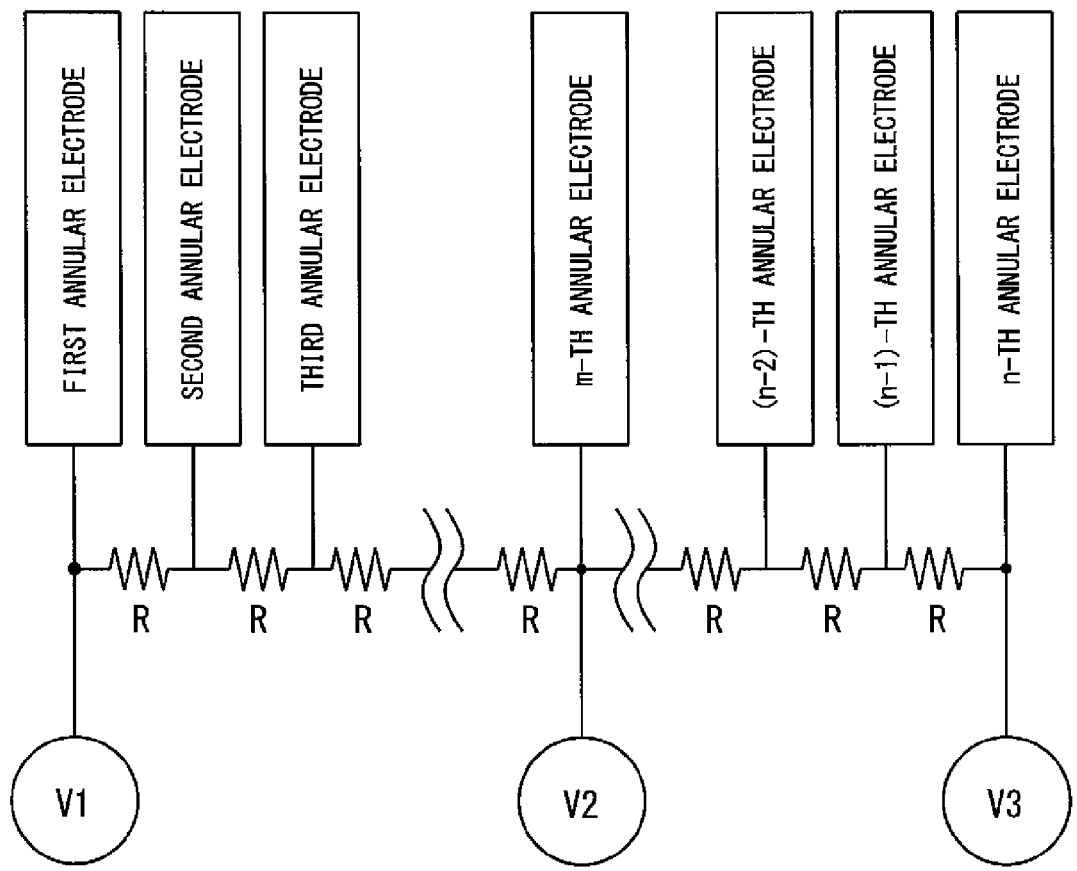
FIG. 9B is a schematic diagram representing a method for connecting between annular electrodes and a method for applying voltages to annular electrodes in the phase modulation device according to one embodiment of the invention.

FIGS. 9A and 9B are diagrams illustrating a relationship between annular electrodes and applied voltages to be applied thereto when the phase modulation device 3 has n annular electrodes. The center electrode is called as the first annular electrode, the outermost peripheral annular electrode is called as the n-th annular electrode, and the annular electrode to which a maximum voltage is applied is called as the m-th annular electrode.

FIG. 9A illustrates annular electrodes to which voltages are applied by the control circuit 12 by 2-level driving. A voltage V1 is applied to the first annular electrode at the center and to the n-th annular electrode at the outermost periphery, and a voltage V2 is applied to the m-th annular electrode. Selecting a defocus value in such a manner that the phase modulation amounts at the center and at the end in a phase distribution of generated wave front aberrations are equal to each other makes it possible to match the phase modulation amount at the center electrode with the phase modulation amount at the outermost peripheral electrode. As a result of the above control, the voltage applied to the center electrode is made equal to the voltage value of the voltage to be applied to the n-th annular electrode at the outermost periphery. Further, applying the voltages as described above makes it possible to minimize the PV value. In this way, in the example of 2-level driving, it is possible to vary the amplitude of the phase modulation amount without changing the relative ratio of the phase modulation profile, with use of a difference between the applied voltages V1 and V2. Further, the above driving method has a feature that the phase modulation profile has a fixed shape, regardless of the advantage that the number of levels of the voltage values to be directly applied to the annular electrodes by the control circuit 12 are only two.

On the other hand, FIG. 9B illustrates annular electrodes to which voltages are applied by the control circuit by 3-level driving. The method in FIG. 9B is substantially the same as the method for determining the voltage to be applied to each of the annular electrodes by 2-level driving in a point that the voltage to be applied to each of the annular electrodes is determined by resistance division. In the configuration of FIG. 9B, however, a voltage V3 to be applied to the n-th annular electrode at the outermost periphery by the control circuit 12 may be different from a voltage V1 to be applied to the first annular electrode. In this way, applying the voltages to the center electrode and to the outermost peripheral electrode independently of each other in such a manner that an intended phase modulation amount is generated with respect to the n-th annular electrode at the outermost periphery makes it possible to compensate aberrations with high precision by causing the phase modulation device 3 to display a phase modulation profile in accordance with a numerical aperture NA, even when objective lenses having numerical apertures NAs different from each other are used. In this way, using the 3-level driving makes it possible to extend the degree of freedom with respect to a phase modulation profile to be displayed on the phase modulation element 11, and as described above, allows for the phase modulation device 3 to display a phase modulation profile in accordance with objective lenses having a fixed pupil diameter but having numerical apertures NAs different from each other. Further, using the 3-level driving makes it possible to flexibly change the shape of a phase modulation profile such as approximation of a phase modulation profile to a profile corresponding to a different pupil diameter at a fixed numerical aperture NA. Thus, the phase modulation device 3 is operable to compensate aberrations, while suppressing residual aberrations.

Next, a method for varying a phase modulation profile to be displayed by the phase modulation device 3 in accordance with objective lenses having numerical apertures NAs different from each other is described in detail.

First of all, quantitative determination on spherical aberrations generated by numerical apertures NAs is made in order to obtain a phase modulation profile optimum for each of the numerical apertures NAs. The ratio between third-order spherical aberration coefficient $Z_{13}$ and fifth-order spherical aberration coefficient $Z_{25}$ when the numerical aperture NA is 1.2 is about 2.4:1.

Figure 10A:
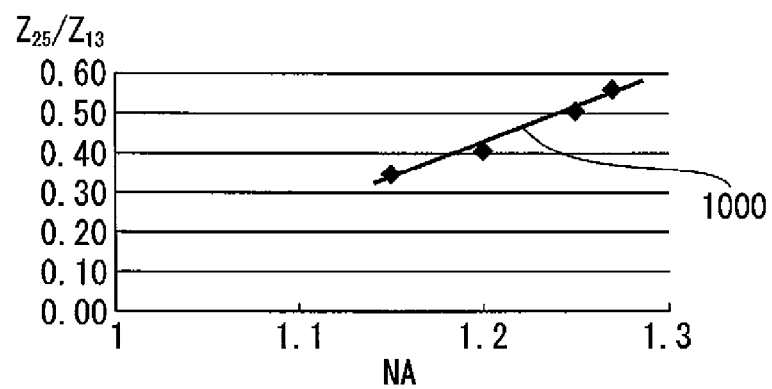
FIG. 10A is a diagram illustrating a relationship between the numerical aperture NA and the ratio ($Z_{25}/Z_{13}$) when the numerical aperture NA of the objective lens is in the range of from 1.15 to 1.27, and the objective lens is an immersion lens.
Figure 10B:
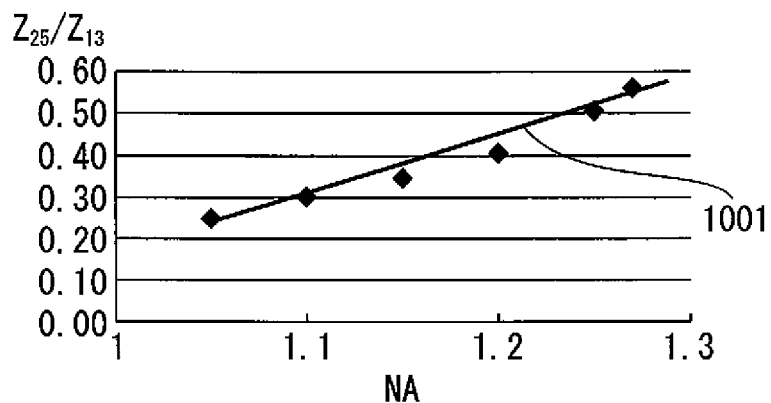
FIG. 10B is a diagram illustrating a relationship between the numerical aperture NA and the ratio ($Z_{25}/Z_{13}$) when the numerical aperture NA of the objective lens is in the range of from 1.05 to 1.27, and the objective lens is an immersion lens.
Figure 10C:
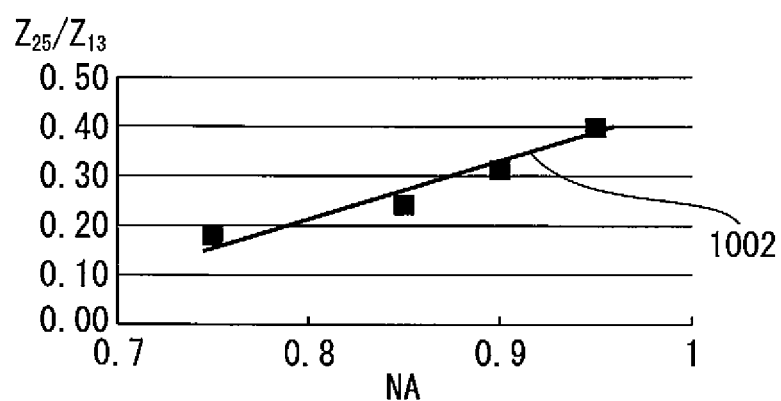
FIG. 10C is a diagram illustrating a relationship between the numerical aperture NA and the ratio ($Z_{25}/Z_{13}$) when the numerical aperture NA of the objective lens is in the range of from 0.75 to 0.95, and the objective lens is a dry lens.

FIG. 10A is a diagram illustrating a relationship between the numerical aperture NA and the ratio ($Z_{25}/Z_{13}$) between $Z_{13}$ and $Z_{25}$ when the numerical aperture NA of the objective lens in the laser microscope is within the range of from 1.15 to 1.27, and the objective lens is an immersion lens. A straight line 1000 is an approximation straight line representing a relationship between the numerical aperture NA and the ratio ($Z_{25}/Z_{13}$). Further, FIG. 10B is a diagram illustrating a relationship between the numerical aperture NA and the ratio ($Z_{25}/Z_{13}$) between $Z_{13}$ and $Z_{25}$ when the numerical aperture NA of the objective lens in the laser microscope is within the range of from 1.05 to 1.27. A straight line 1001 is an approximation straight line representing a relationship between the numerical aperture NA and the ratio ($Z_{25}/Z_{13}$). Further, FIG. 10C is a diagram illustrating a relationship between the numerical aperture NA and the ratio ($Z_{25}/Z_{13}$) between $Z_{13}$ and $Z_{25}$ when the numerical aperture NA of the objective lens in the laser microscope is within the range of from 0.75 to 0.95, and the objective lens is a dry lens. A straight line 1002 is an approximation straight line representing a relationship between the numerical aperture NA and the ratio ($Z_{25}/Z_{13}$). In FIGS. 10A to 10C, the horizontal axis indicates the numerical aperture NA, and the vertical axis indicates the ratio ($Z_{25}/Z_{13}$).

The curves 1000 to 1002 are respectively represented by the following equations (1) to (3).

$$\frac{Z_{25}}{Z_{13}} = 1.91 \times NA - 1.87 \quad (1)$$

$$\frac{Z_{25}}{Z_{13}} = 1.37 \times NA - 1.21 \quad (2)$$

$$\frac{Z_{25}}{Z_{13}} = 1.06 \times NA - 0.64 \quad (3)$$

Preferably, the phase distribution to compensate the generated spherical aberrations may be a linear sum of aberrations represented by the ratios as described above.

A Strehl ratio, as one of the indexes indicating the performance of an optical imaging system is known. The Strehl ratio is a ratio between a peak luminance, on an imaging surface, of light from a point light source in an optical system, and a peak luminance in a diffraction limit optical system. An optical system having a Strehl ratio closer to 1 is regarded as an optical system having a higher imaging performance. Generally, as far as the Strehl ratio is 0.8 or larger, it is possible to neglect the influence on the imaging performance due to residual aberrations (see e.g. page 198 "Introduction to Optics for User Engineers" by Toshiro KISHIKAWA, published by the Optronics Co., Ltd.). The Strehl ratio and the wave front aberration ($\sigma$, RMS value) have a relationship as represented by the equation (4). Further, the relationship between the wave front aberration (RMS value) and each of the wave front aberration coefficients is represented by the equation (5). In this example, the wave front aberration coefficients are values in the unit of rad.

$$\text{Strehl} = \frac{1}{\exp(\sigma^2)} \cong 1 - \sigma^2 \quad (4)$$

$$\sigma = \frac{Z_{13}}{\sqrt{5}} \quad \sigma = \frac{Z_{25}}{\sqrt{7}} \quad (5)$$

$$\left(\frac{xA_{13}}{\sqrt{7}}\right)^2 = 0.2 \quad x = \sqrt{\frac{1.4}{A_{13}^2}} \quad (6)$$

Therefore, assuming that third-order spherical aberration $A_{13}$ is generated in an immersion objective lens whose numerical aperture NA is 1.2, for instance, it is conceived that fifth-order spherical aberration is generated by $0.45A_{13}$. In this case, if aberration is corrected in a state that the value of fifth-order spherical aberration is shifted by x, ($x \cdot A_{13}$)/($7^{1/2}$) (RMS value) remains as fifth-order aberration according to the equation (5).

As described above, as far as the Strehl ratio is 0.8 or larger, it is possible to reduce the influence on the imaging performance due to residual aberrations. Therefore, assuming that the tolerance of the Strehl ratio is 0.8, the maximum value of the shift amount x is represented by the equation (6). Therefore, taking into consideration a difference in numerical aperture NA, preferably, the ratio ($A_{25}/A_{13}$) may satisfy the relationship represented by the following equation.

$$1.91NA - 1.87 - \sqrt{\frac{1.4}{A_{13}^2}} \leq \frac{A_{25}}{A_{13}} \leq 1.91NA - 1.87 + \sqrt{\frac{1.4}{A_{13}^2}}$$

(immersion objective lens, $1.15 \leq NA \leq 1.27$)

$$1.37NA - 1.21 - \sqrt{\frac{1.4}{A_{13}^2}} \leq \frac{A_{25}}{A_{13}} \leq 1.37NA - 1.21 + \sqrt{\frac{1.4}{A_{13}^2}}$$

(immersion objective lens, $1.05 \leq NA \leq 1.27$)

$$1.06NA - 0.64 - \sqrt{\frac{1.4}{A_{13}^2}} \leq \frac{A_{25}}{A_{13}} \leq 1.06NA - 0.64 + \sqrt{\frac{1.4}{A_{13}^2}}$$

(dry objective lens, $0.75 \leq NA \leq 0.95$)

Let us study an example of the range of x that satisfies the Strehl ratio of 0.8 in a condition that a specimen is observable regardless of the presence or absence of a cover glass.

Third-order spherical aberration coefficient of spherical aberration generated by the presence or absence of a cover glass is about 5.2, taking into consideration that the thickness of a general cover glass is 0.17 mm. It is preferable for the phase modulation device 3 to correct the aforementioned aberrations from a neutral position. Therefore, a correction amount having a range of about 10 is necessary. The value of x is a little less than 0.23 when the wavelength is 488 nm, for instance, according to the equation (6) described above. The ratio of fifth-order spherical aberration with respect to third-order spherical aberration is preferably about 0.42±0.23.

Assuming that the ratio between third-order spherical aberration component and fifth-order spherical aberration component is A:B when a phase distribution generated at the numerical aperture NA of an objective lens is resolved using Zernike polynomials, the relationship between the numerical aperture NA and the ratio B/A can be represented by the following equation.

$$1.91NA - 1.87 - \sqrt{\frac{1.4}{A^2}} \le \frac{B}{A} \le 1.91NA - 1.87 + \sqrt{\frac{1.4}{A^2}}$$

(immersion objective lens, $1.15 \le NA \le 1.27$)

$$1.37NA - 1.21 - \sqrt{\frac{1.4}{A^2}} \le \frac{B}{A} \le 1.37NA - 1.21 + \sqrt{\frac{1.4}{A^2}}$$

(immersion objective lens, $1.05 \le NA \le 1.27$)

$$1.06NA - 0.64 - \sqrt{\frac{1.4}{A^2}} \le \frac{B}{A} \le 1.06NA - 0.64 + \sqrt{\frac{1.4}{A^2}}$$

(dry objective lens, $0.75 \le NA \le 0.95$)

Further, actual objective lenses have a variety of pupil diameters and numerical apertures NAs. Therefore, it is preferable to create a phase modulation profile in accordance with a variety of combinations of pupil diameters and numerical apertures NAs. In this case, it is preferable to use one common configuration of electrodes for driving a liquid crystal layer of the phase modulation element 11, regardless of the difference in pupil diameter and numerical aperture NA. It is preferable to insulate the annular electrodes from each other so that the control circuit 12 is operable to apply an intended voltage to each of the annular electrodes. According to this configuration, the control circuit 12 is operable to cause the phase modulation element 11 to display a phase modulation profile in accordance with the pupil diameter and the numerical aperture NA by controlling the voltages to be applied to the annular electrodes independently of each other.

Figure 11A:
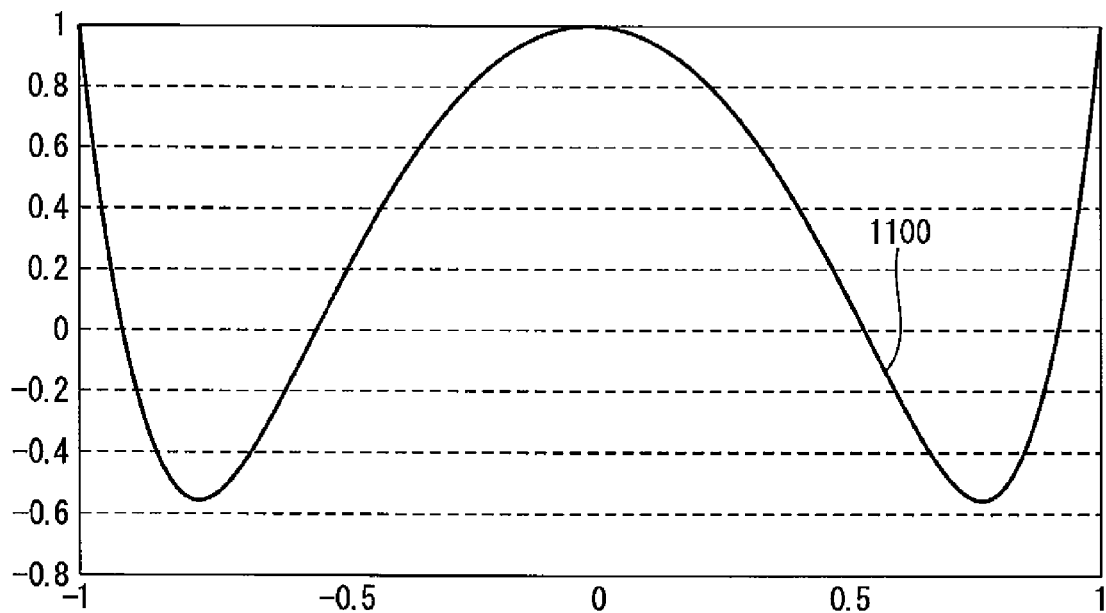
FIG. 11A is a diagram illustrating a sectional profile of a phase distribution of spherical aberration generated by an objective lens whose numerical aperture NA is 1.0.
Figure 11B:
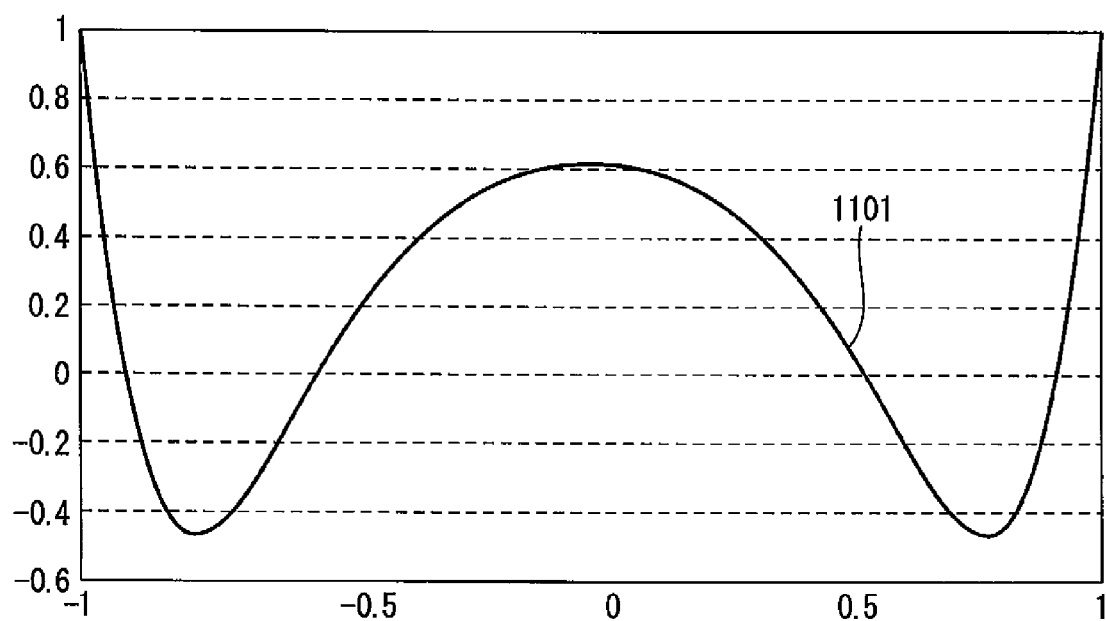
FIG. 11B is a diagram illustrating a sectional profile of a phase distribution of spherical aberration generated by an objective lens whose numerical aperture NA is 1.2.
Figure 11C:
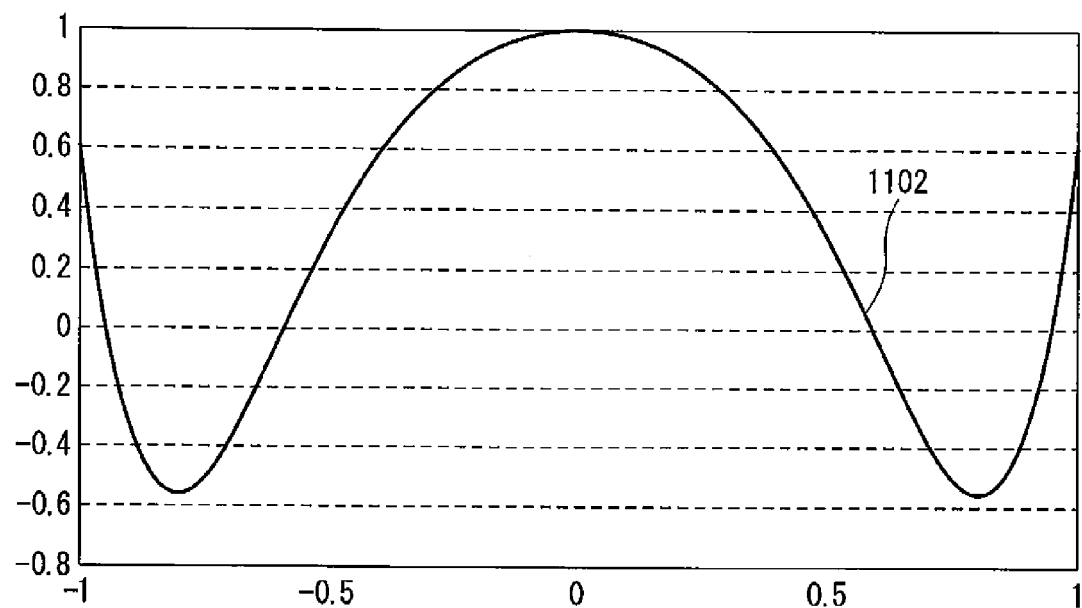
FIG. 11C is a diagram illustrating a sectional profile of a phase distribution of spherical aberration generated by an objective lens whose numerical aperture NA is 0.8.

FIGS. 11A, 11B, and 11C illustrate a difference in phase distribution of aberration due to a difference in numeral aperture NA of the objective lens. A curve 1100 illustrated in FIG. 11A, a curve 1101 illustrated in FIG. 11B, and a curve 1102 illustrated in FIG. 11C respectively indicate phase distributions of complex aberrations when the numerical aperture NA is 1.0, 1.2, and 0.8. In FIGS. 11A to 11C, the vertical axis indicates a value obtained by normalizing the phase difference, setting that the positive maximum value of the phase difference is "1", and the horizontal axis indicates a value obtained by normalizing the effective diameter, setting that the maximum value of the effective diameter is "1".

In this example, the defocus value is fixed with respect to each of the numerical apertures NAs. When the phase distribution of aberration differs depending on the objective lenses, the control circuit 12 controls the voltage to be applied to each of the annular electrodes by 3-level driving as illustrated in FIG. 9B so that various phase modulation profiles are reproducible. The ratios between the voltages V1, V2, and V3 to be applied to the first annular electrode, the m-th annular electrode, and the n-th annular electrode are obtained in advance in such a manner that the phase distribution of aberration is cancelled, each time the objective lens is exchanged. A storage unit in the control circuit 12 may store in advance the ratios between the voltages in correspondence to the pupil diameter and the numerical aperture NA of the objective lens. Then, the control circuit 12 may read the ratios between the voltages V1, V2, and V3 in accordance with the objective lens from the storage unit, and may determine the voltage to be applied to each of the annular electrodes in accordance with the ratios. The final voltage adjustment (voltages V1, V2, and V3) may be manually performed by allowing the user to view an image via an unillustrated user interface. Alternatively, the control circuit 12 may automatically set the voltages that maximize the contrast, while feedback controlling the information to be obtained from an image such as contrast.

In the foregoing, examples of 2-level driving and 3-level driving have been described. The invention, however, is not limited to the above. For instance, although the number of voltage levels increases, wiring may be provided for each of the annular electrodes so that voltages different from each other are applied to the individual annular electrodes. In this modification, even if the objective lens is changed, the control circuit is operable to cause the phase modulation element 11 to display a phase modulation profile optimum for the objective lens. As a result, the laser microscope 1 is operable to acquire a desirable image.

Further, as described above, a phase difference depends on the wavelength of light to be incident on a liquid crystal layer. The laser light source 1 in a general laser microscope is operable to irradiate laser light of a selected wavelength from among a plurality of wavelengths of laser light. However, a required phase modulation amount differs depending on the wavelength of laser light for use. Therefore, it is necessary for the control circuit 12 of the phase modulation device 3 to correct the phase modulation amount due to the phase modulation element 11. The control circuit is operable to correct a phase modulation amount deviation due to a difference in wavelength by changing the voltage to be applied to the liquid crystal layer of the phase modulation device 3. Further, the control circuit 12 is operable to cancel a phase modulation amount deviation due to a temperature difference or the like by adjusting the voltage to be applied to the liquid crystal layer of the phase modulation element 11.

In the following, a method for obtaining an optimum phase modulation amount due to a difference in wavelength of laser light is described. A curve 1200 illustrated in FIG. 12 indicates wavelength dispersion characteristics of liquid crystal provided and sealed in a liquid crystal layer of the phase modulation device 3 in the foregoing embodiment. The horizontal axis indicates a wavelength, and the vertical axis indicates a value obtained by normalizing the phase difference (Δnd) of the phase modulation device 3 in such a manner that the value of the phase difference when the wavelength is 550 nm is equal to 1. As represented by the curve 1200, for instance, the degree of wavelength dispersion is 1.057 when the wavelength of laser light is 488 nm, and the degree of wavelength dispersion is 1.200 when the wavelength of laser light is 405 nm. This reveals that $\Delta n (=n_e-n_o)$ differs depending on the wavelength of laser light, because the thickness d of the liquid crystal layer has a fixed value. Therefore, even if the specimen 5 illustrated in FIG. 1 is observed at a fixed position, an optimum phase modulation profile differs depending on the wavelength of the laser light source 1 for use. In view of the above, it is preferable to optimize a phase modulation profile by adding a degree of wavelength dispersion optimum for a target wavelength, as a parameter, to the calculation equation representing a phase modulation profile so that the phase modulation element 11 imparts a transmitting light flux with the optimum phase modulation profile.

Figure 12:
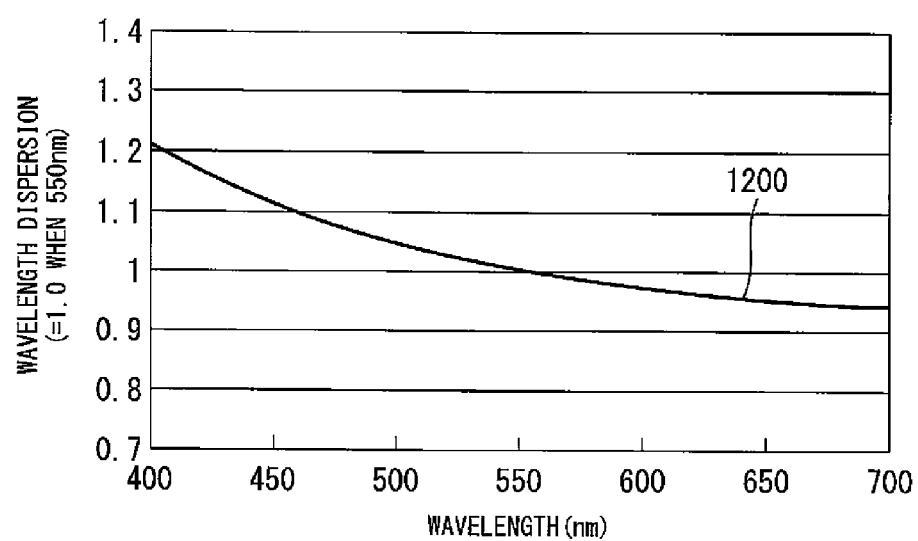
FIG. 12 is a diagram illustrating wavelength dispersion of a liquid crystal device with respect to laser light wavelength.

Specifically, it is necessary to use the wavelength of the laser light source 1 for use as a parameter in order to create a phase modulation profile. In other words, multiplying a degree of wavelength dispersion as illustrated in FIG. 12 as a coefficient by the phase modulation profile created as described above makes it possible to obtain an optimized phase modulation profile, taking into consideration of the wavelength of laser light from the laser light source. The control circuit 12 may adjust the voltage to be applied to each of the electrodes of the phase modulation element 11, based on the optimized phase modulation profile.

Further, in the embodiments described above, a liquid crystal element is used as the phase modulation element of the phase modulation device, but the phase modulation element is not limited to a liquid crystal element. For instance, an optical crystal element having an electro-optical effect as represented by a Pockels effect may be used as the phase modulation element. In this modification, as well as the case of using a liquid crystal element, annular electrodes the center of which is the optical axis are mounted on one surface of an optical crystal element on a flat plate, and an electrode is mounted on the other surface of the optical crystal element so as to cover the entirety of the surface. As well as the embodiments, each of the electrodes may preferably be a transparent electrode. In this modification, as well as the embodiments, adjusting the voltage applied to each of the annular electrodes by the control circuit makes it possible to cause the optical crystal element to display a phase modulation profile for correcting aberrations of an optical system including an objective lens, and to impart a light flux transmitting through the optical crystal element with a phase distribution in accordance with the phase modulation profile.

As another modification, a deformable mirror may be used as the phase modulation element, although the deformable mirror is of a reflective-type mirror. In this modification, annular electrodes, the center of which is the optical axis, are mounted on the deformable mirror. Adjusting the voltage to be applied to each of the annular electrodes by the control circuit makes it possible to represent a phase modulation profile that corrects aberrations of an optical system including an objective lens by the deformable mirror, and to impart a light flux reflected on the deformable mirror with a phase distribution in accordance with the phase modulation profile.

The embodiments have been described by an example of a laser microscope. Use of the phase modulation device of the invention is not limited to the above example. The invention may be applied to any optical apparatus, as far as the optical apparatus is provided with an objective lens and is incorporated with a coherent light source. The invention is also applicable to an OCT (Optical Coherence Tomography), for instance.

As is evident from the above description, those skilled in the art can make various modifications to the embodiments without departing from the scope and spirit of the present invention.

REFERENCE SIGNS LIST 1 laser light source
2 collimating optical system
3 phase modulation device
4 objective lens
5 specimen
6 beam splitter
7 confocal optical system
8 confocal pinhole
9 detector
11 phase modulation element
12 control circuit
21, 22 transparent substrate
23 sealing member
33 transparent electrode
34 liquid crystal molecules

What is claimed is:
1. A phase modulation device for correcting wave front aberrations generated by an optical system including an objective lens disposed on an optical path of a light flux of coherent light to be emitted from a coherent light source, comprising:

a phase modulation element which comprises a plurality of annular electrodes in a concentric form, the center of which is an optical axis of the optical system, and modulates a phase of the light flux transmitting through the objective lens in accordance with a voltage applied to each of the annular electrodes; and a control circuit which controls the voltage to be applied to each of the plurality of annular electrodes, wherein the control circuit controls the voltage to be applied to each of the plurality of annular electrodes in such a manner that the light flux is imparted with a phase modulation amount in accordance with a phase modulation profile which has a polarity opposite to a polarity of a phase distribution of the wave front aberrations and is determined according to a relational equation representing a relationship between a numerical aperture of the objective lens and a ratio between third-order spherical aberration and fifth-order spherical aberration when the phase distribution of the wave front aberrations is resolved using Zernike polynomials; and the control circuit applies a voltage to one of the annular electrodes corresponding to a first position where the phase modulation amount of the phase modulation profile is maximum in such a manner that a maximum value of the phase modification amount is generated on the first position and applies a voltage to another one of the annular electrodes corresponding to a second position where the phase modulation amount of the phase modulation profile is minimum in such a manner that a minimum value of the phase modulation amount is generated on the second position.

2. The phase modulation device according to claim 1, wherein the objective lens is an immersion objective lens, and the numerical aperture of the objective lens satisfies the following condition:

$$1.15 \leq NA \leq 1.27$$

where NA represents the numerical aperture of the objective lens, and the relational equation is represented by the following equation:

$$1.91NA - 1.87 - \sqrt{\frac{1.4}{A^2}} \leq \frac{B}{A} \leq 1.91NA - 1.87 + \sqrt{\frac{1.4}{A^2}}$$

where A represents a third-order spherical aberration component, B represents a fifth-order spherical aberration component, and NA represents the numerical aperture of the objective lens.

3. The phase modulation device according to claim 1, wherein the objective lens is an immersion objective lens, and the numerical aperture of the objective lens satisfies the following condition:

$$1.05 \leq NA \leq 1.27$$

where NA represents the numerical aperture of the objective lens, and the relational equation is represented by the following equation:

$$1.37NA - 1.21 - \sqrt{\frac{1.4}{A^2}} \leq \frac{B}{A} \leq 1.37NA - 1.21 + \sqrt{\frac{1.4}{A^2}}$$

where A represents a third-order spherical aberration component, B represents a fifth-order spherical aberration component, and NA represents the numerical aperture of the objective lens.

4. The phase modulation device according to claim 1, wherein the objective lens is a dry objective lens, and the numerical aperture of the objective lens satisfies the following condition:

$$0.75 \leq NA \leq 0.95$$

where NA represents the numerical aperture of the objective lens, and the relational equation is represented by the following equation:

$$1.06NA - 0.64 - \sqrt{\frac{1.4}{A^2}} \leq \frac{B}{A} \leq 1.06NA - 0.64 + \sqrt{\frac{1.4}{A^2}}$$

where A represents a third-order spherical aberration component, B represents a fifth-order spherical aberration component, and NA represents the numerical aperture of the objective lens.

5. The phase modulation device according to claim 1, wherein the phase modulation profile is determined in such a manner that a phase modulation amount on an optical axis of the optical system is equal to a phase modulation amount at an end of an active region, the active region being a region capable of phase-modulating a light flux on the phase modulation element.

6. The phase modulation device according to claim 1, wherein the phase modulation profile is determined in such a manner that a root mean square value of the phase modulation profile is minimized.

7. The phase modulation device according to claim 1, wherein the phase modulation element is a liquid crystal element.

8. The phase modulation device according to claim 7, wherein the control circuit adjusts the phase modulation profile in accordance with a wavelength of the coherent light.

9. The phase modulation device according to claim 1, wherein
the annular electrodes are connected to each other by one or more resistors, and
a voltage applied to each of the annular electrodes corresponding to a position other than the first and second positions being determined by dividing a difference between the voltage to be applied to the annular electrode whose phase modulation amount is maximum, and the voltage to be applied to the annular electrode whose phase modulation amount is minimum, by a resistance value of corresponding resistor connected between the annular electrodes.

10. The phase modulation device according to claim 1, wherein
the control circuit applies a voltage to an outermost peripheral annular electrode, as well as to the annular electrodes corresponding to the first position where the phase modulation amount is maximum and corresponding to the second position where the phase modulation amount is minimum.

11. A laser microscope, comprising:
a coherent light source which irradiates coherent light;
a first optical system disposed on an optical path of a light flux of the coherent light, and including an objective lens to focus the light flux on a specimen;
a second optical system which transmits a light flux including specimen information derived from the specimen to a detector; and
the phase modulation device of claim 1, wherein
the phase modulation element of the phase modulation device is disposed between the coherent light source and the objective lens.

* * * * *